United States Patent

Maack

[11] Patent Number: 6,111,728
[45] Date of Patent: Aug. 29, 2000

[54] DEVICE FOR MOUNTING A HEAD SUPPORT ON A HEAD DISC

[75] Inventor: Werner Maack, Seeheim, Germany

[73] Assignee: U.S. Philips Corporation, New York, N.Y.

[21] Appl. No.: 08/417,505

[22] Filed: Apr. 4, 1995

Related U.S. Application Data

[63] Continuation of application No. 08/111,681, Aug. 25, 1993, abandoned.

[30] Foreign Application Priority Data

Apr. 20, 1993 [DE] Germany ............................ 43 10 897

[51] Int. Cl.$^7$ ........................................................ G11B 5/56
[52] U.S. Cl. ................................................................ 360/290
[58] Field of Search ................................. 360/103–104, 360/109

[56] References Cited

U.S. PATENT DOCUMENTS

| 4,658,316 | 4/1987 | Narita | 360/109 |
| 4,872,077 | 10/1989 | Tezuka | 360/109 |
| 5,173,820 | 12/1992 | Yoneda | 360/109 |
| 5,175,659 | 12/1992 | Yamanaka | 360/109 |

FOREIGN PATENT DOCUMENTS

| 4110589 | 10/1992 | Germany . | |
| 2-87375 | 3/1990 | Japan | 360/109 |
| 4274010 | 9/1992 | Japan | 360/109 |

OTHER PUBLICATIONS

DCR 100 Digitale 4:2:2 MAZ, BTS Broadcast Televisions Systems GmbH (no translation).

*Primary Examiner*—Allen T. Cao
*Attorney, Agent, or Firm*—Leroy Eason

[57] ABSTRACT

A device for mounting a head support (12), which carries a magnetic head (13) at its front, on a head disc (15). The head support (12) is mounted in a separate housing (10) and the housing (10) is secured to the head disc (15) in order to improve the reliability.

20 Claims, 2 Drawing Sheets

DEVICE FOR MOUNTING A HEAD SUPPORT ON A HEAD DISC

This is a continuation of application Ser. No. 08/111,681, filed on Aug. 25, 1993 ABN.

BACKGROUND OF THE INVENTION

The invention relates to a device for mounting a head support on a head disc of a magnetic-tape apparatus, which head support carries a magnetic head at its front.

A device of the type defined in the opening paragraph is known, for example from DE-OS 41 10 589 or from the BTS leaflet "DCR 100 Digitale 4:2:2 MAZ". This leaflet shows a scanner for a magnetic video recording apparatus comprising a head disc which is rotatable between two stationary drums. The head disc carries plate-shaped head supports which at their outer radial ends each carry a magnetic head and which at their inner radial ends are secured to the head disc via a washer and a screw. By means of a set-screw each head support can be bent to adjust it to the nominal dimension of the magnetic head. The magnetic heads serve for recording on or reading a magnet tape cooperating with the scanner.

The continually decreasing width of magnetic-tape tracks in magnetic tape apparatus coming to market requires ever tighter tolerances of the head positions on the head disc of the scanner. Centrifugal forces, environmental influences (temperature, shocks, vibrations), forces produced by the magnetic tape and internal stresses in the head supports affect the fine adjustment of the magnetic-head positions and often lead to impermissible deviations.

SUMMARY OF THE INVENTION

It is an object of the invention to achieve an improved mounting of the head support on the head disc in order to minimize said deviations.

In a device of the type defined in the opening paragraph, this object is achieved in that the head support is mounted in a separate housing and the housing is secured to the head disc. The use of such a housing for each head support enables such head supports to be mounted on the head disc in a more reliable manner by simple means. This is based on the principle that initially the housing can be secured to the head disc by special fixing means independently of the subsequently mounted head support. Then, the head support can be introduced into the housing and after adjustment it can be secured in the housing. This enables the required reliability to be increased simply in that the housing and the head support are each secured in separate operations.

In a suitable embodiment, the housing is positioned by means of shoulders or pins and is secured to the head disc by means of a screw-thread connection. Positioning by means of shoulders or pins saves an intricate manual adjustment. For the screw-thread connection there may be provided, for example, two diagonally arranged screws.

In a further embodiment of the invention the head support is secured in the housing by means of at least one screw-thread connection. Preferably, this is effected at the inner radial end of the head support. The housing then has, for example, a screw-thread at the appropriate location to receive the fixing screw inserted from the top. It is also possible to fit the fixing screw into a threaded bore in the head support from the underside of the head disc through openings in the head disc and in the housing.

In a further embodiment of the invention the head support is arranged to be adjustable in the height direction by means of a set-screw. The set-screw is then fitted, for example, in a threaded bore in the head support and abuts against the housing. In the case of adjustment from the underside of the head disc, the set-screw is fitted into a threaded bore in the housing via an opening in the head wheel and abuts against the head support. By the use of a housing with set-screws thus mounted it is achieved that the forces active when the head support is secured and adjusted are absorbed and are thus isolated from the head disc.

In a further embodiment of the invention, the housing is constructed in such a manner that a head support mounted therein is adjustable in the lateral and the axial direction. For this purpose the head support and the housing, for example, each have a bore for receiving a lever to be inserted for lateral or axial adjustment.

In a special embodiment of the invention, the head support secured and adjusted in the housing is encapsulated with the housing. Thus, the position of the head support in the housing, once it has been adjusted, is fixed permanently and can no longer be changed. In a further embodiment of the invention encapsulation is simplified in that the housing has openings for this purpose, which guarantees a maximal support and stability in the housing. In the case of a damaged head the housing with the encapsulated head support can be replaced in a simple manner. For this purpose it is merely required to loosen the screws securing the housing to the head disc.

In a further suitable embodiment of the invention the housing is constructed as a shielding by suitable shaping and a suitable material choice. Alternatively, it may have a closed shape.

For assembly, the housings are first positioned by means of shoulders or pins and secured to the head disc by means of screws. Subsequently, the head supports are inserted into the housings and are adjusted. After adjustment the head supports are encapsulated in the housings.

BRIEF DESCRIPTION OF THE DRAWINGS

FIG. 1 shows a housing for a head support;

FIG. 2 shows the same housing with a head support mounted in it;

FIG. 3 is a sectional view of a construction as shown in FIG. 2 for mounting and adjusting the head support from the top; and FIG. 4 shows a similar construction for mounting and adjusting the head support from underneath.

DESCRIPTION OF THE PREFERRED EMBODIMENT

Figure 1:
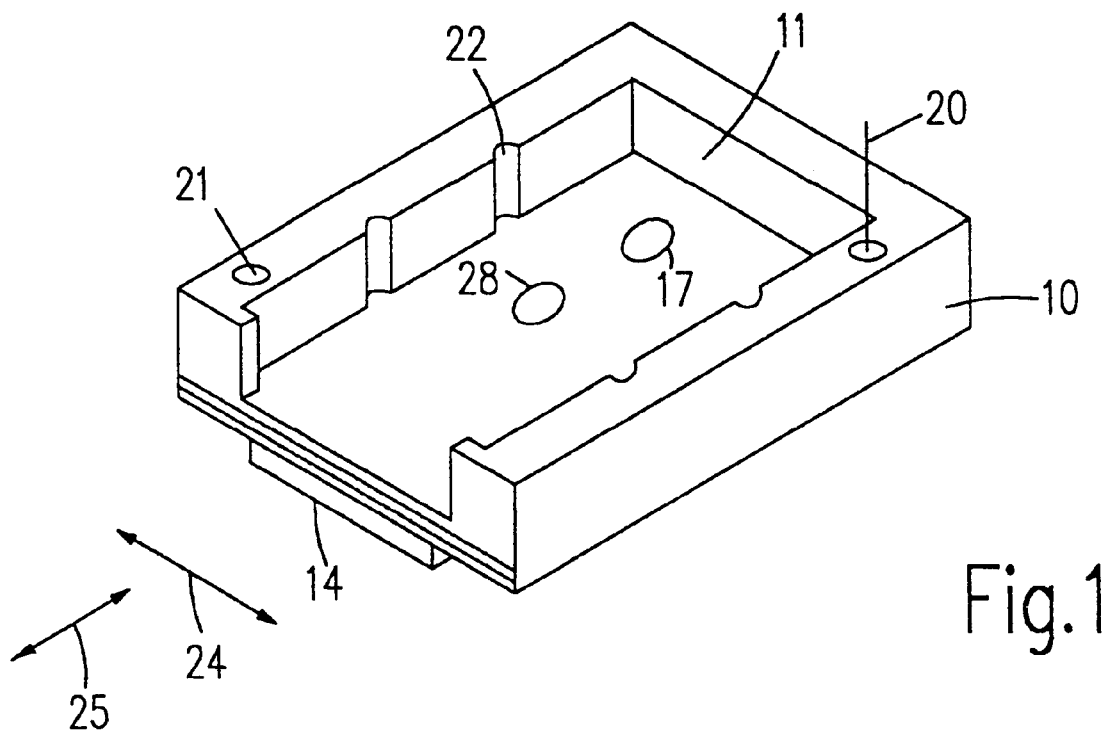
FIGS. 1 to 4 of the drawings diagrammatically show exemplary embodiments of the invention.
Figure 2:
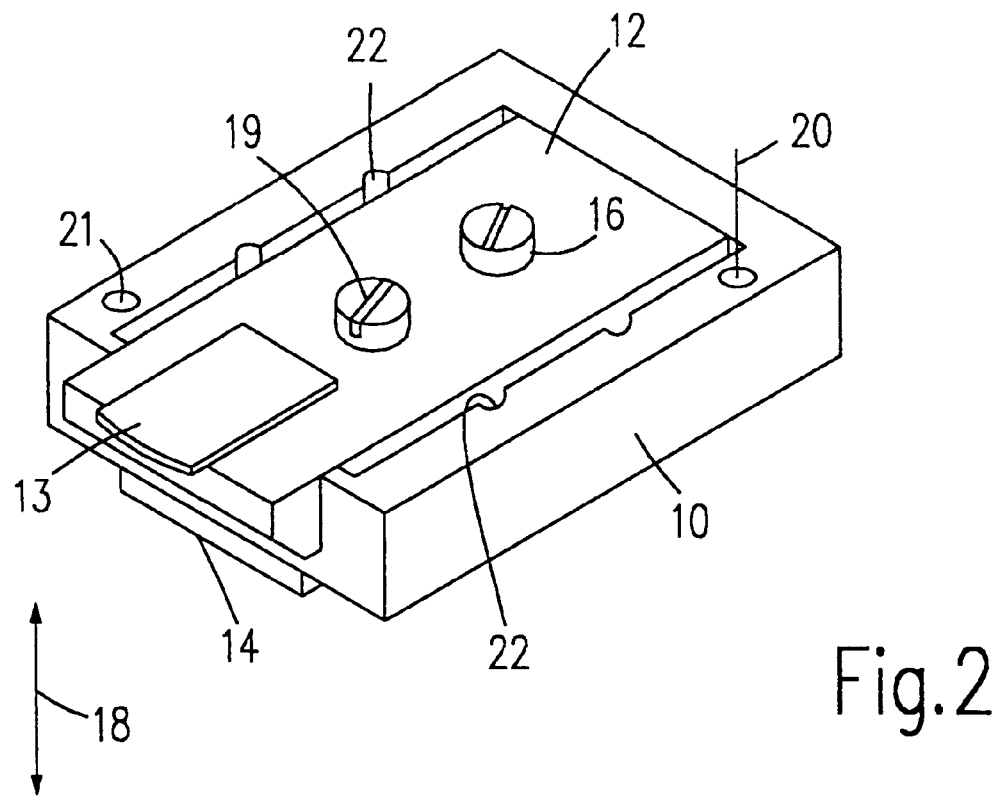
Figure 3:
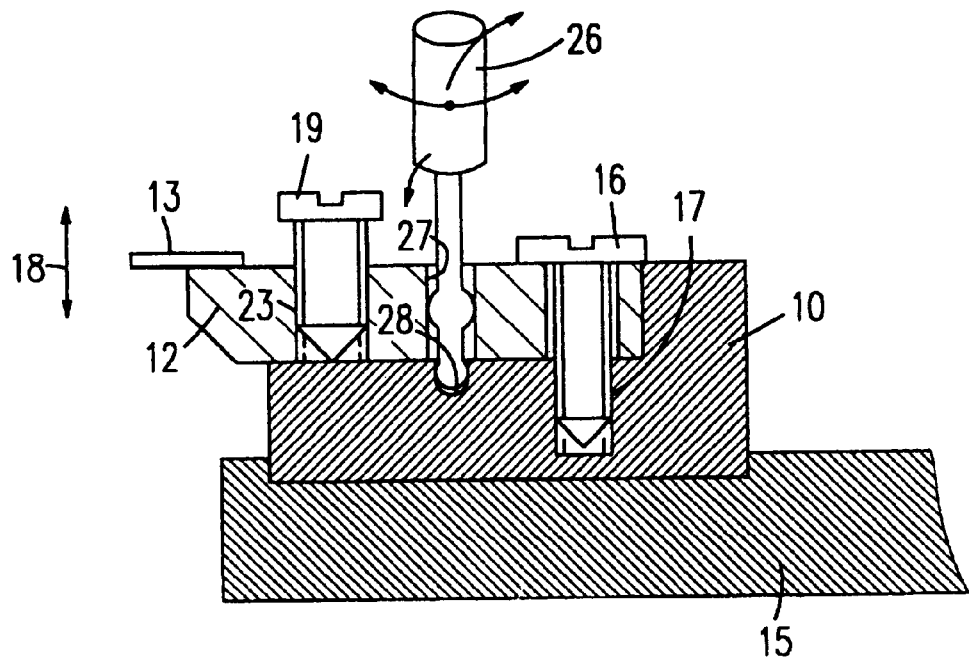

The housing 10 has a recess 11 for receiving a head support 12 carrying a magnetic head 13 at its outer radial end. At its underside the housing 10 has a projection portion 14 which serves for centering when the housing 10 is secured to the head disc 15 of a scanner. The projecting portion 14 then engages a corresponding recess in the head disc 15. In FIGS. 2 and 3 the head support 12 is secured to the housing 10 by means of a fixing screw 16, which housing has been provided with a threaded bore 17 for this purpose. The height adjustment of the head support 12 in the recess 11 in the direction 18 is effected by means of a set-screw 19 which can be inserted from the top and which abuts against the housing 10. The housing 10 can be secured to the head disc 15 via fixing screws 20 in bores 21 in the housing 10.

After the head support 12 has been fitted into the recess 11 in the housing 10 and after adjustment the head support 12 is encapsulated in the housing 10 in that an encapsulant is introduced, whose distribution is facilitated by openings 22.

FIG. 3 shows a construction in which the head support 12 is secured in the threaded bore 17 in the housing 10 by means of the fixing screw 16. Adjustment in the direction 18 is effected by means of the set-screw 19, which is fitted into a threaded bore 23 in the head support 12 and which abuts against the housing 10. Adjustment in the lateral direction 24 and the axial direction 25 is effected via a lever 26, which can be inserted from the top into a bore 27 in the head support and into a bore 28 in the housing.

Figure 4:
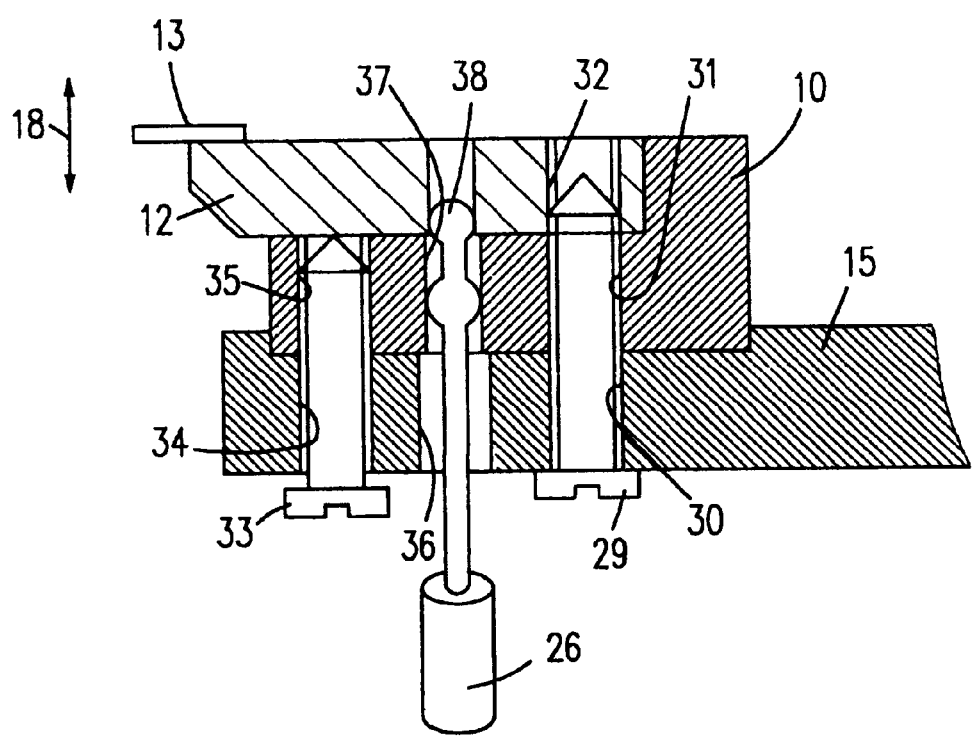

FIG. 4 shows a modification of the construction shown in FIG. 3, the head support 12 now being secured by means of a fixing screw 29 from underneath the head disc 15, which screw is fitted into a threaded bore 32 in the head support 12 via openings 30, 31 in the head disc and in the housing. Adjustment in the height direction 18 is effected by means of a set-screw 33, which can be fitted from underneath into a threaded bore 35 in the housing 10 via an opening 34 in the head disc and which abuts against the head support 12. Adjustment in the lateral direction 24 and the axial direction 25 is effected via a lever 26, which can be inserted from underneath into corresponding bores 36, 37, 38 in the head disc, the housing and the head support.

In the case that the head support would reach or exceed its elastic limit as a result of the adjustment this can be avoided by means of a thinner or thicker housing bottom or by means of shims between the housing and the head disc.

What is claimed is:

1. A magnetic head disc device, comprising:
    a magnetic head disc;
    a magnetic head;
    a magnetic head support carrying the magnetic head;
    a housing for receiving the magnetic head support, said housing being mounted between said head disc and said magnetic head support;
    first securing means for securing the magnetic head support only to said housing; and
    second securing means, independent of said first securing means, for securing said housing to said head disc independent of said first securing means and without contacting said head support such that (i) said housing is first secured to said head disc with said second securing means and (ii) said head support is secured to said housing with said first securing means and adjustable relative to said housing without effecting the securing of the housing to the head disc.

2. A device as claimed in claim 1, wherein the housing includes a projection for positioning said housing on said head disc and said second securing means comprises a screw-thread connection.

3. A device as claimed in claim 2, wherein said first securing means comprises a screw-thread connection securable independently of said second securing means.

4. A device as claimed in claim 3, wherein the head support is adjustable in a height direction perpendicular to said head support and housing by a set-screw.

5. A device as claimed in claim 3, wherein the housing includes a recess for receiving the head support, the recess having a mounting surface in which said head support is mounted, said head support being sized relative to said head support so that said head support mounted thereon is adjustable in a plane parallel to said mounting surface.

6. A device as claimed in claim 5, wherein the head support and the housing each have a bore for receiving a lever to be inserted for adjustment of said head in a plane parallel to said mounting surface of said recess.

7. A device as claimed in claim 6, wherein the head support secured and adjusted in the housing is encapsulated with the housing.

8. A device as claimed in claim 7, wherein the housing has openings for encapsulation.

9. A device as claimed in claim 1, wherein the head support secured and adjusted in the housing (10) is encapsulated with the housing.

10. A device as claimed in claim 2, wherein the head support is adjustable in a height direction perpendicular to said head support and housing by a set-screw.

11. A device as claimed in claim 1, wherein the head support is adjustable in a height direction perpendicular to said head support and housing by a set-screw.

12. A device as claimed in claim 2, wherein the housing includes a recess for receiving the head support, the recess having a mounting surface on which said head support is mounted, said mounting surface being sized relative to said head support so that said head support mounted thereon is adjustable in a plane parallel to said mounting surface.

13. A device as claimed in claim 12, wherein the head support and the housing each have a bore for receiving a lever to be inserted for adjustment of said head in a plane parallel to said mounting surface of said recess.

14. A device as claimed in claim 1, wherein the housing includes a recess for receiving the head support, the recess having a mounting surface on which said head support is mounted, said mounting surface being sized relative to said head support so that said head support mounted thereon is adjustable in a plane parallel to said mounting surface.

15. A device as claimed in claim 14, wherein the head support and the housing each have a bore for receiving a lever to be inserted for adjustment of said head in a plane parallel to said mounting suface of said recess.

16. A device as claimed in claim 1, wherein said first securing means comprises a screw-thread connection securable independently of said second securing means.

17. A magnetic head disc device according claim 1, wherein said second securing means comprises a screw thread connection securable independently of said first securing means.

18. A magnetic head disc device, comprising:
    a magnetic head disc;
    a magnetic head;
    a planar magnetic head support carrying the magnetic head;
    a housing, mounted between the head disc and the magnetic head support, having a recess for receiving the magnetic head support, said recess having a planar mounting surface against which said planar head support is mounted, said planar mounting surface being sized such that said head support is adjustable within said recess on said planar mounting surface in two orthogonal directions parallel to said planar mounting surface, said housing and said head support each comprising a bore, generally aligned with each other, for receiving a lever such that movement of the lever within said bores against said head support and housing is effective to move said head support relative to said planar mounting surface in said two orthogonal directions;
    a first screw-thread connection for securing said head support only to said housing;
    a second screw-thread connection for securing said housing to said head disc independent of said first screw-thread connection; and a third screw-thread connection for adjusting said head support in a height direction perpendicular to said planar mounting surface.

19. A device as claimed in claim 18, characterized in that the housing has openings for encapsulation.

20. A magnetic head disc device, comprising:

a magnetic head disc;

a magnetic head;

a planar magnetic head support carrying the magnetic head;

a housing, mounted between the head disc and the magnetic head support, having a recess for receiving the magnetic head support, said recess having a planar mounting surface against which said planar head support is mounted, said planar mounting surface being sized such that said head support is adjustable within said recess on said planar mounting surface in two orthogonal directions parallel to said planar mounting surface, said housing and said head support each comprising a bore, generally aligned with each other, for receiving a lever such that movement of the lever within said bores against said head support and housing is effective to move said head support relative to said planar mounting surface in said two orthogonal directions;

a first fastener for securing said head support only to said housing;

a second fastener for securing said housing to said head disc independent of said first fastener and without contacting said head support such that (i) said housing is first secured to said head disc with said second fastener and (ii) said head support is secured to said housing with said first fastener and adjustable relative to said housing without effecting the securing of the housing to the head disc; and an adjuster for adjusting said head support in a height direction perpendicular to said planar mounting surface.

* * * * *